Figure 1:
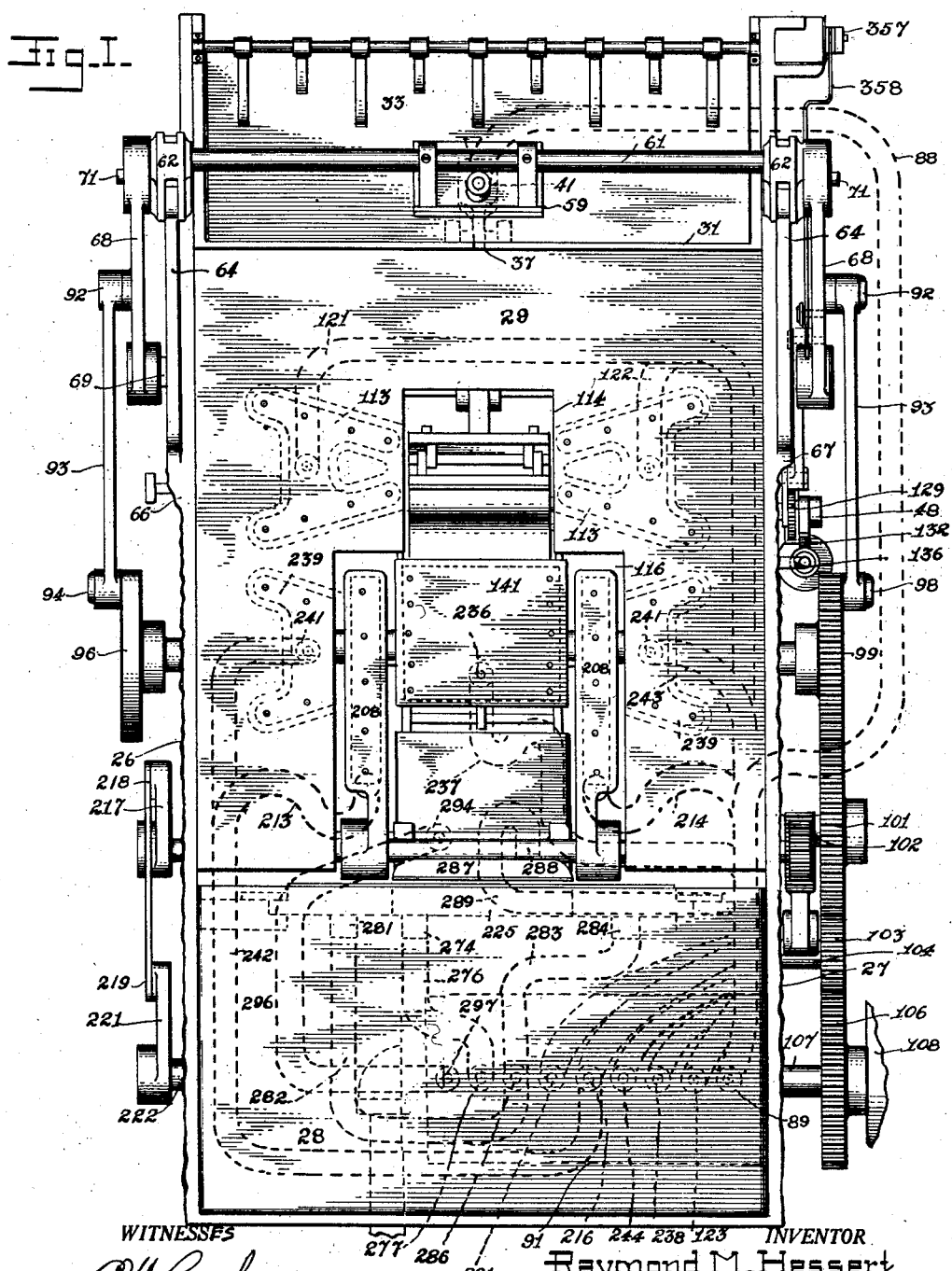

Dec. 26, 1933.   R. M. HESSERT   1,941,004
COMBINED PHOTOGRAPHING, ENDORSING, AND PERFORATING
MACHINE FOR CHECKS AND THE LIKE
Filed Feb. 27, 1930   11 Sheets-Sheet 1

Dec. 26, 1933.   R. M. HESSERT   1,941,004
COMBINED PHOTOGRAPHING, ENDORSING, AND PERFORATING
MACHINE FOR CHECKS AND THE LIKE
Filed Feb. 27, 1930   11 Sheets-Sheet 3

WITNESSES

INVENTOR
Raymond M. Hessert.
BY
Joshua R. H. Potts
ATTORNEY

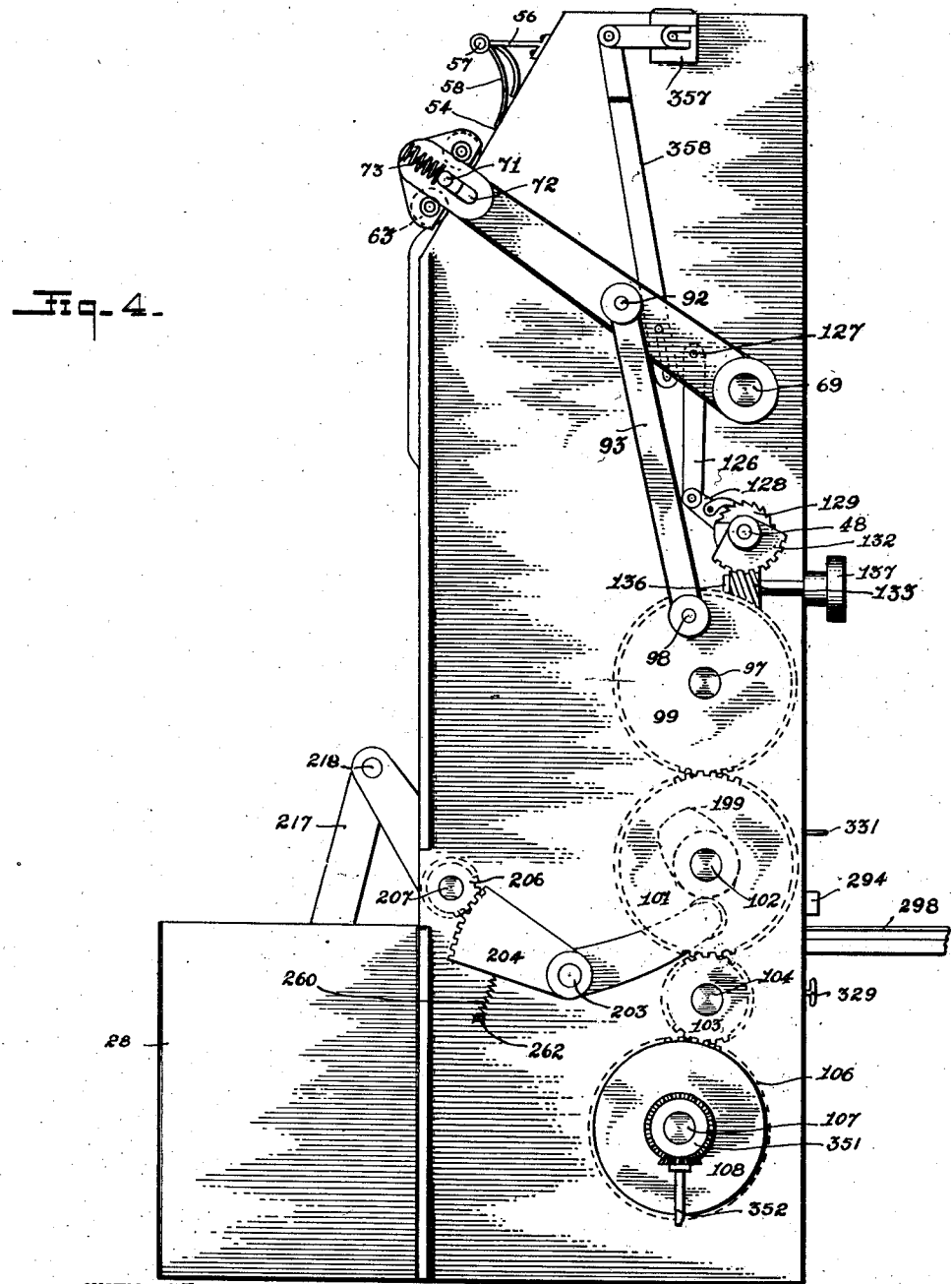

Dec. 26, 1933.  R. M. HESSERT  1,941,004
COMBINED PHOTOGRAPHING, ENDORSING, AND PERFORATING
MACHINE FOR CHECKS AND THE LIKE
Filed Feb. 27, 1930   11 Sheets-Sheet 5
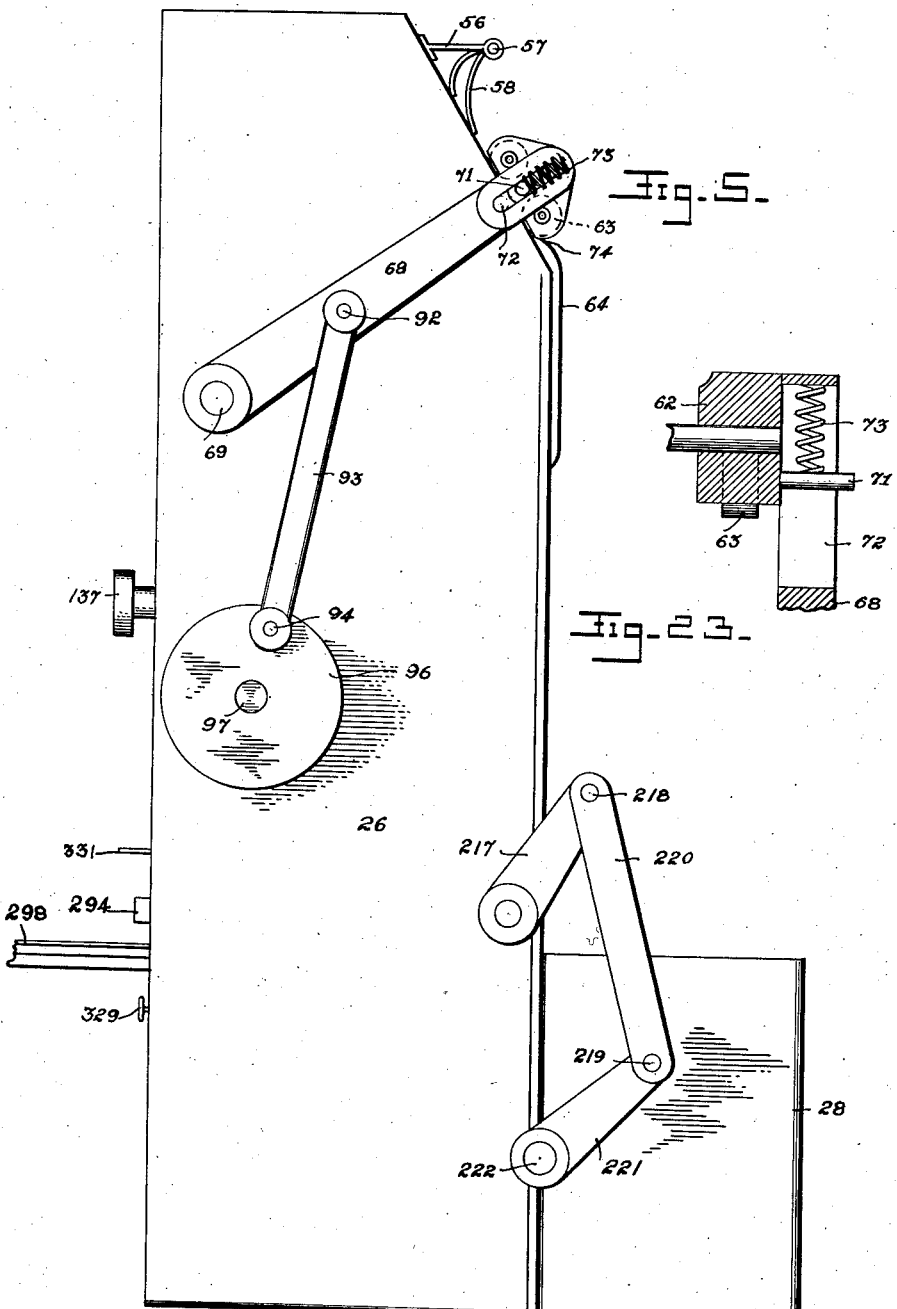
INVENTOR
Raymond M. Hessert
BY
Joshua R H Potts
ATTORNEY Dec. 26, 1933.    R. M. HESSERT    1,941,004
COMBINED PHOTOGRAPHING, ENDORSING, AND PERFORATING
MACHINE FOR CHECKS AND THE LIKE
Filed Feb. 27, 1930    11 Sheets-Sheet 6
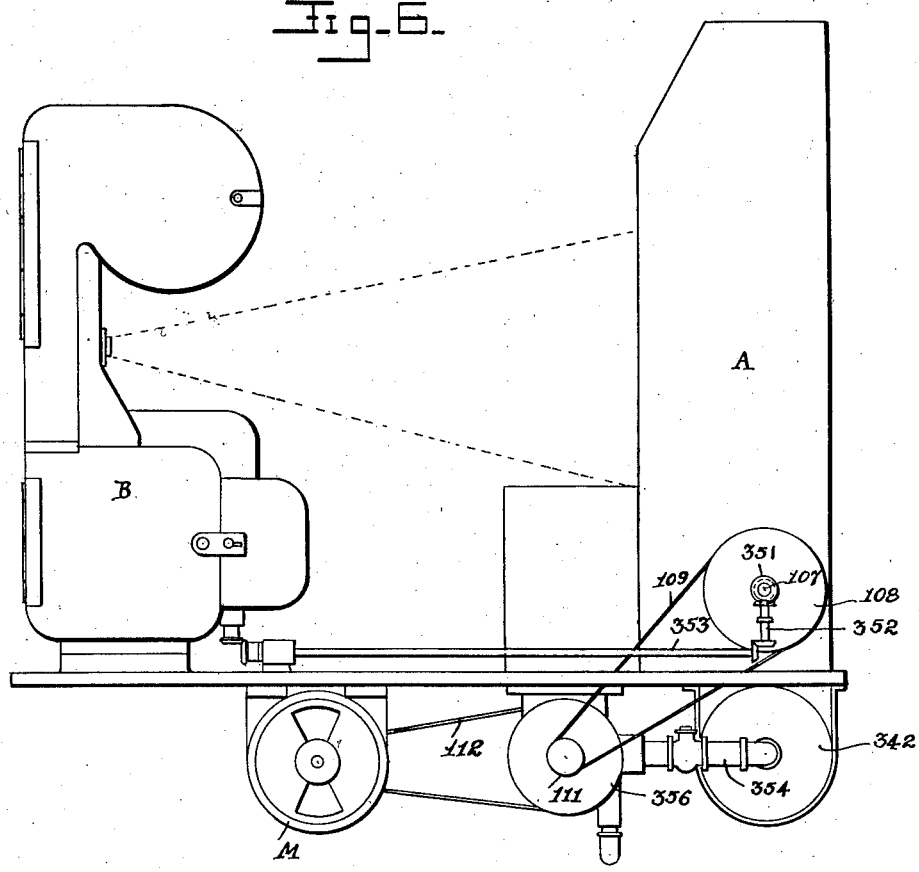
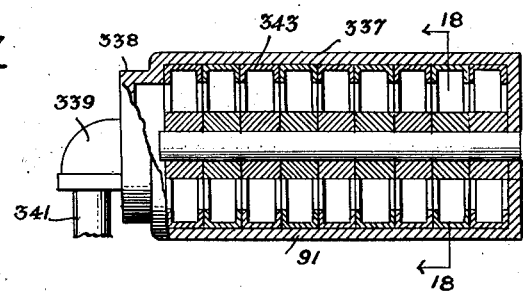
WITNESSES
INVENTOR
Raymond M. Hessert
BY
Joshua R. H. Potts
ATTORNEY Dec. 26, 1933.  R. M. HESSERT  1,941,004
COMBINED PHOTOGRAPHING, ENDORSING, AND PERFORATING
MACHINE FOR CHECKS AND THE LIKE
Filed Feb. 27, 1930  11 Sheets-Sheet 7

WITNESSES

INVENTOR
Raymond M. Hessert
BY
Joshua R. H. Potts
ATTORNEY

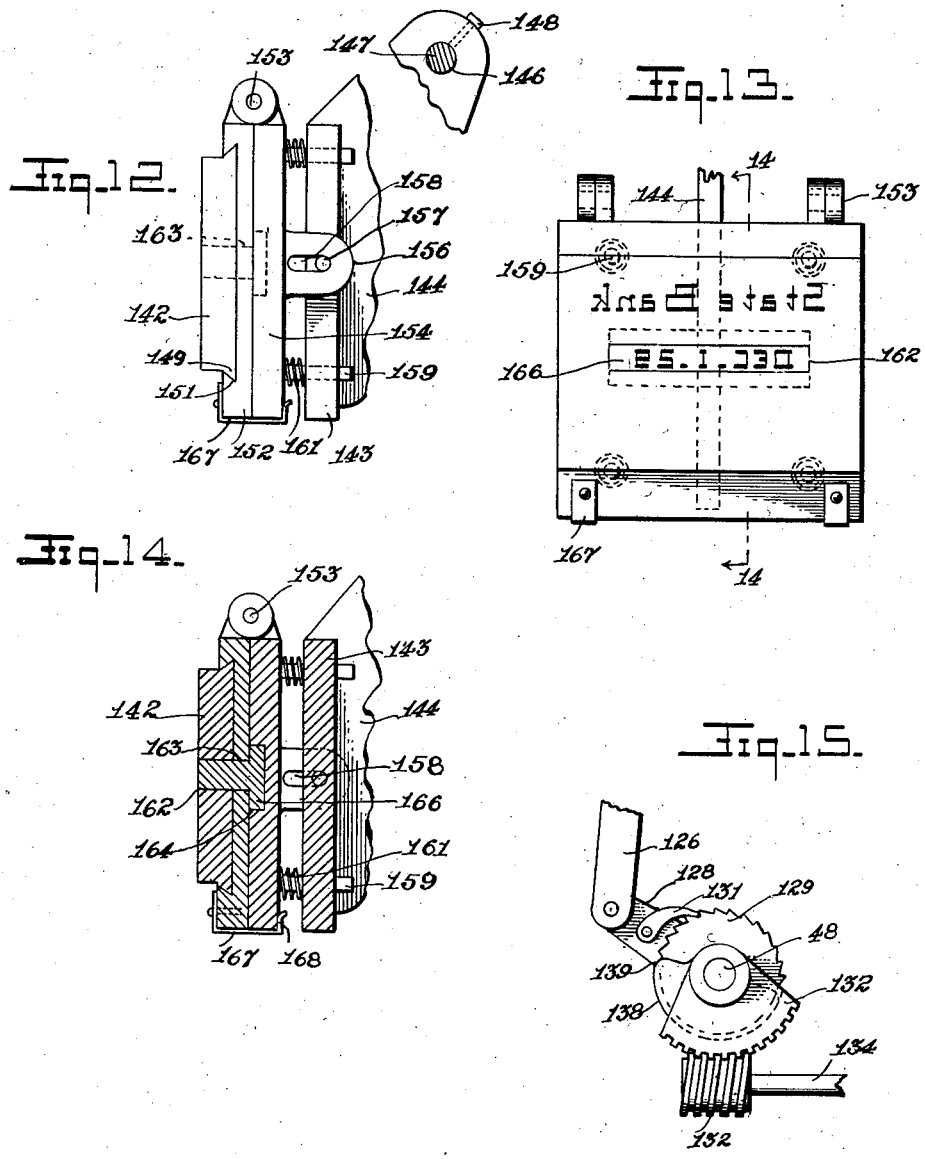

Dec. 26, 1933.  R. M. HESSERT  1,941,004
COMBINED PHOTOGRAPHING, ENDORSING, AND PERFORATING
MACHINE FOR CHECKS AND THE LIKE
Filed Feb. 27, 1930  11 Sheets-Sheet 9
Fig. 16.
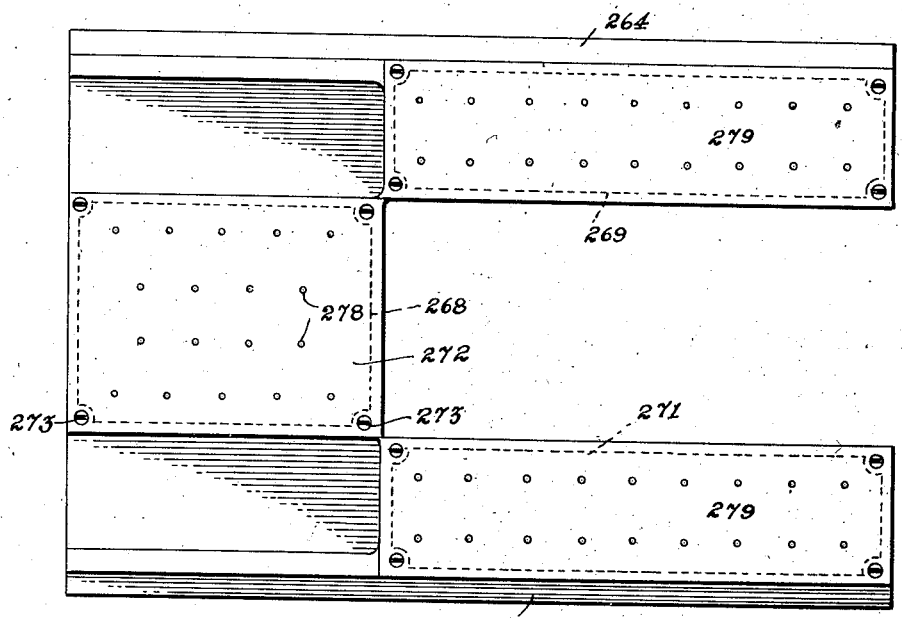
Fig. 18.
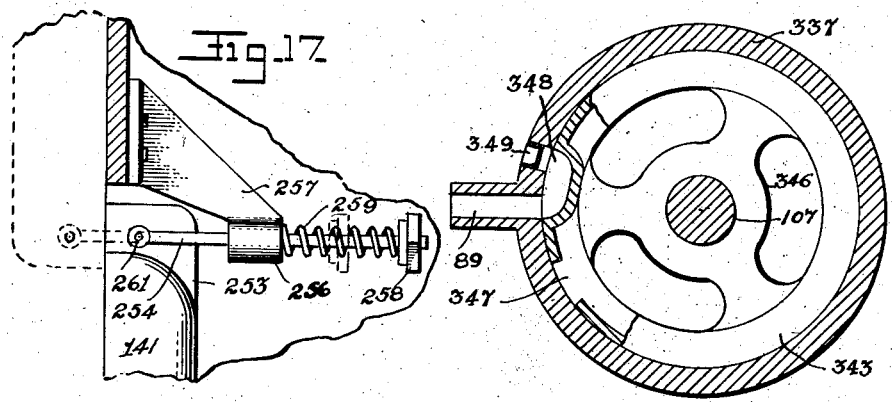
Fig. 17.
WITNESSES
INVENTOR
Raymond M. Hessert
BY
ATTORNEY Dec. 26, 1933.  R. M. HESSERT  1,941,004
COMBINED PHOTOGRAPHING, ENDORSING, AND PERFORATING
MACHINE FOR CHECKS AND THE LIKE
Filed Feb. 27, 1930   11 Sheets-Sheet 10
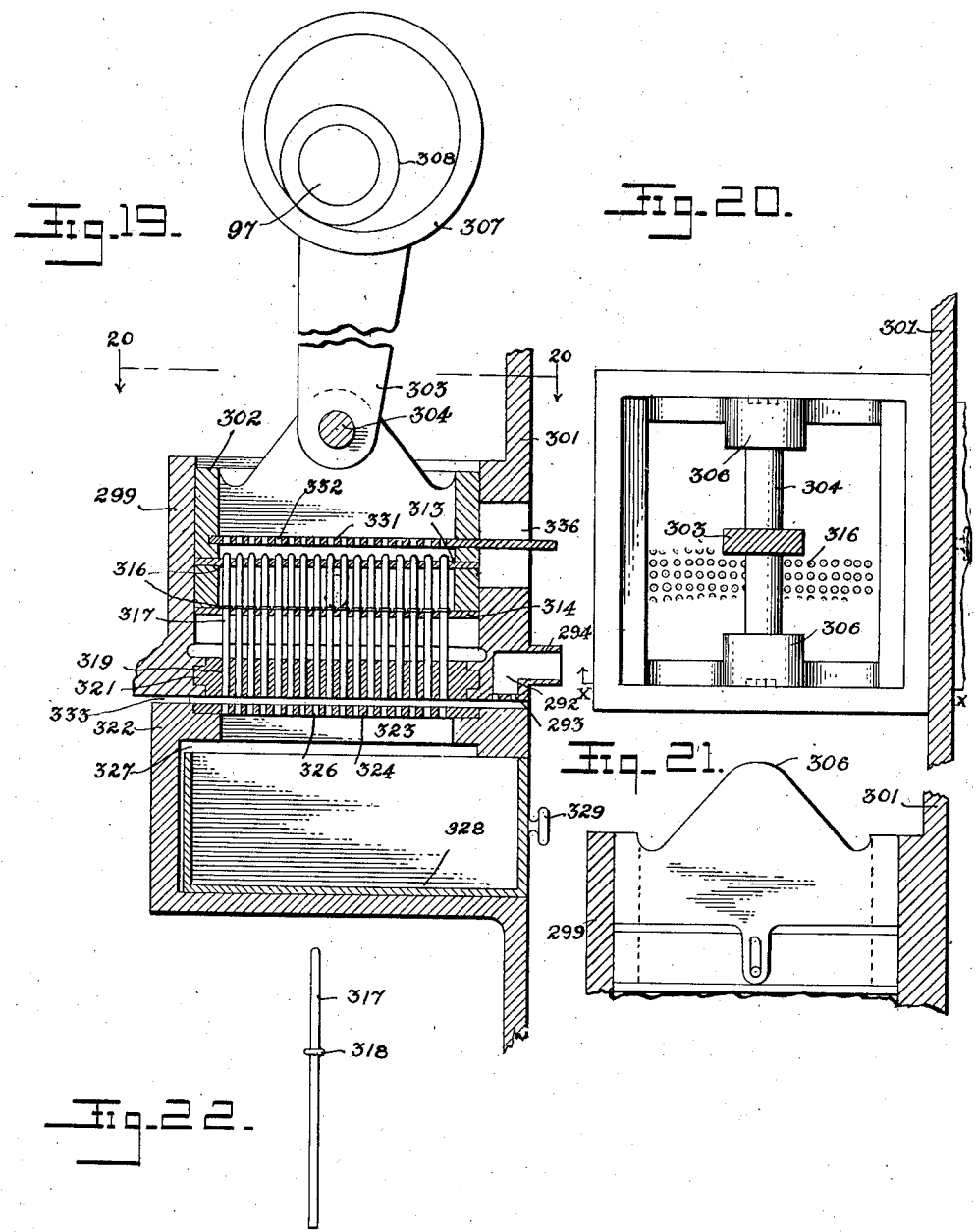
INVENTOR
Raymond M. Hessert
BY
ATTORNEY

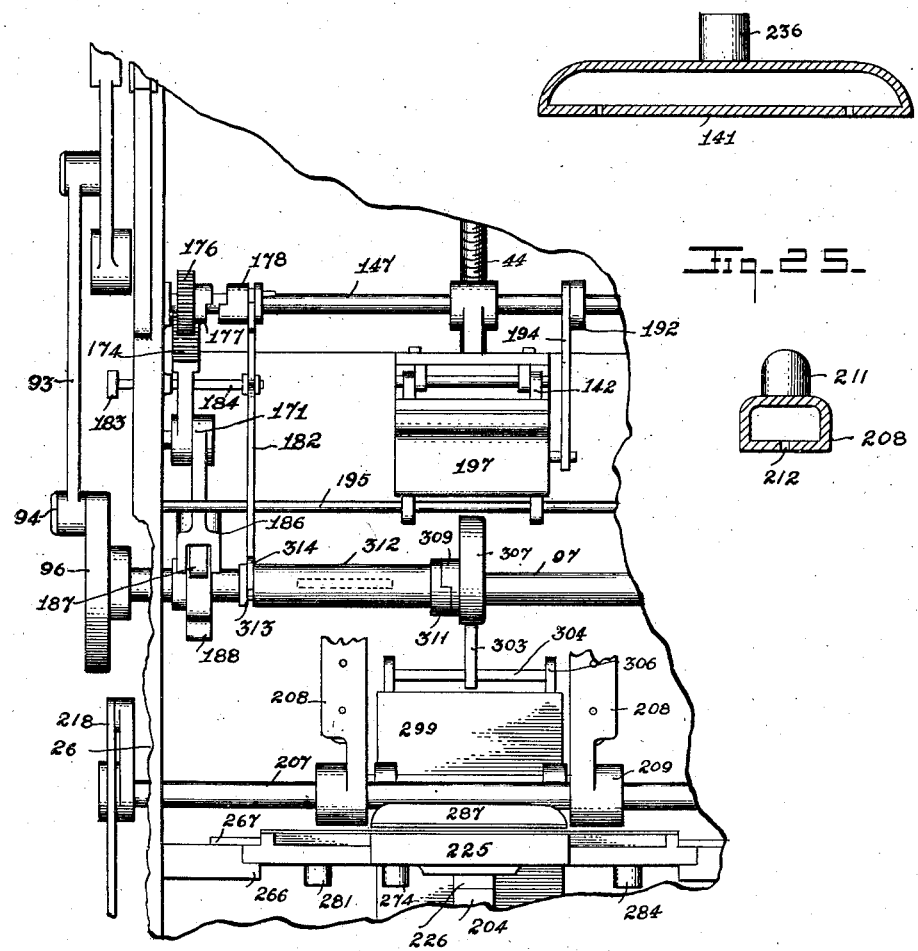

Patented Dec. 26, 1933

1,941,004

UNITED STATES PATENT OFFICE 1,941,004

COMBINED PHOTOGRAPHING, ENDORSING, AND PERFORATING MACHINE FOR CHECKS AND THE LIKE

Raymond M. Hessert, Philadelphia, Pa.

Application February 27, 1930. Serial No. 431,665

19 Claims. (Cl. 88—24)

This invention relates to a machine for photographing, endorsing and perforating paper, and is primarily intended for use in banks and the like for photographing, endorsing and cancelling the checks of depositors.

Banks until very recently have kept no evidence of checks which have been cashed or paid from a depositor's account, but upon the rendition of a statement to the depositor have returned all canceled checks with said statement.

With such a system the bank retains no evidence, other than the entry on its books, that checks had been paid and were ofttimes called to credit amounts to a depositor's account because of lack of evidence to refute the depositor's claim.

This led to the photographing of checks by the bank so that a record of both the front and back of the check, with its endorsements, was kept by the bank for reference in case of a dispute in a depositor's account.

A machine for photographing checks and one which is in successful operation in numerous banks today is described and claimed in my copending application, Serial No. 315,387, filed October 27, 1928.

By the photographing method such as described in that application, the photographing constituted an additional expense in that this was a separate and distinct step through which checks must pass over and above the usual system through which checks passed before the photographing machine was introduced.

All checks which are received by a bank are endorsed or perforated. These are separate and distinct steps and each requires the services of an operator for handling the mechanism for performing the operation.

All checks which are paid by a bank during the day's business must be photographed and canceled by perforating. These are called "bookkeeping checks".

All checks which are drawn on other banks and credited to a depositor's account must be endorsed before being sent for clearance. These are called "transit checks".

Before the advent of the photographing apparatus for checks, it sometimes happened that checks drawn on foreign banks were lost in transit, for instance, by theft, wrecking and burning of an airplane, or other catastrophy. And in each instance the bank, having credited the amount of the check to the depositor's account, would have no evidence aside from its bookkeeping records of the check which had been presented for credit.

It, therefore, follows that upon the advent of the photographic apparatus for checks, each check drawn on another bank was photographed and endorsed before being sent for clearance. These were two distinct steps.

Also where checks are to be sent, for instance to a Federal Reserve Bank, for payment, it was necessary, under the old system, to prepare a deposit slip or transit letter, enumerating all the banks and the amounts of the checks in the same manner that a depositor prepares a deposit slip when making his deposits.

With the advent of the photographing apparatus, duplicate films are used as the checks are run through the machine, and one of these films serves as a deposit slip or transit letter and is sent along with the checks for payment to the Federal Reserve Bank, while the other film is retained for the bank's record.

This photographing, being done automatically, saves the time formerly consumed in preparing a long deposit slip or transit letter.

The object of the present invention is to provide a machine which will automatically photograph and either endorse or cancel the checks, depending upon the nature of the checks and in which these operations are performed without manual assistance.

Another object of the invention is to provide a machine for performing the operations just above stated, so that by combining the operations of photographing and of either cancelling or endorsing the checks, a great amount of labor and separate machines may be dispensed with, thereby saving not only the salaries of operators, but also considerable space in the bank which may be devoted to other purposes.

Another object is to provide a machine into which a plurality of checks may be stacked, and which said machine will be provided with mechanism for separately and successively placing the front of checks in position for being photographed, either on a single or duplicate film, then photographing the same and then successively reversing the checks, photographing in like manner the rear of the same, and then either endorsing the check or perforating the same, depending upon the nature of the check, and finally, depositing the successive checks in a neat pile and in the same order in which they were originally stacked in the machine.

A further object of the invention is to provide such a mechanism with means for holding the checks in position to be photographed and whereby the whole of said check may be photographed without the photographing of any mechanical means for holding the checks in position.

Still a further object of the invention is to provide mechanisms arranged in such timed relation that any number of checks may be passed through the machine to be operated upon in proper sequence and without any interference between the respective mechanisms which handle the checks.

Still a further object of the invention is to provide means whereby the uppermost check of a stack will always be presented in proper position for reception by the mechanism which carries it to a position to be photographed.

Another object of the invention is to provide means whereby the stamp for endorsing the checks will be automatically inked without manual intervention.

A still further object of the invention is to provide the camera with mechanism operated through the mechanism which advances the checks so that the shutter of the camera will operate to take the photographs of the checks successively presented, without photographing the mechanisms which present the checks in proper position for photographing.

Another object of the invention is to provide automatic perforating mechanism which may be daily set in an easy and simple manner and without the necessity of adjusting any part or parts of the mechanisms.

An object of the invention is to provide a machine for photographing, endorsing and cancelling checks which will be compact and require the minimum amount of space for operation.

According to the invention, the machine is provided with an adjustable magazine for holding a stack of checks, means for picking up the uppermost check and carrying it to a position to be photographed, means for holding the check in the position whereby its reverse side may be photographed, means operating in proper timed relation for photographing the front and back of successive checks, means for endorsing the back of said check, means for advancing the check to a position to be perforated, means for perforating the check, and means for stacking the successive checks in the same sequence as originally stacked in the magazine.

The machine is provided with means for operating the mechanisms just above described and for operating a suction pump and a distributor which exerts a step-by-step suction upon the checks as they are successively passed through the several mechanism.

The machine is also provided with means for automatically inking the endorsing stamp, means for automatically raising the stack of checks in the magazine as the uppermost checks are removed for photographing, and may be provided with means for counting the number of checks photographed.

Figure 2:
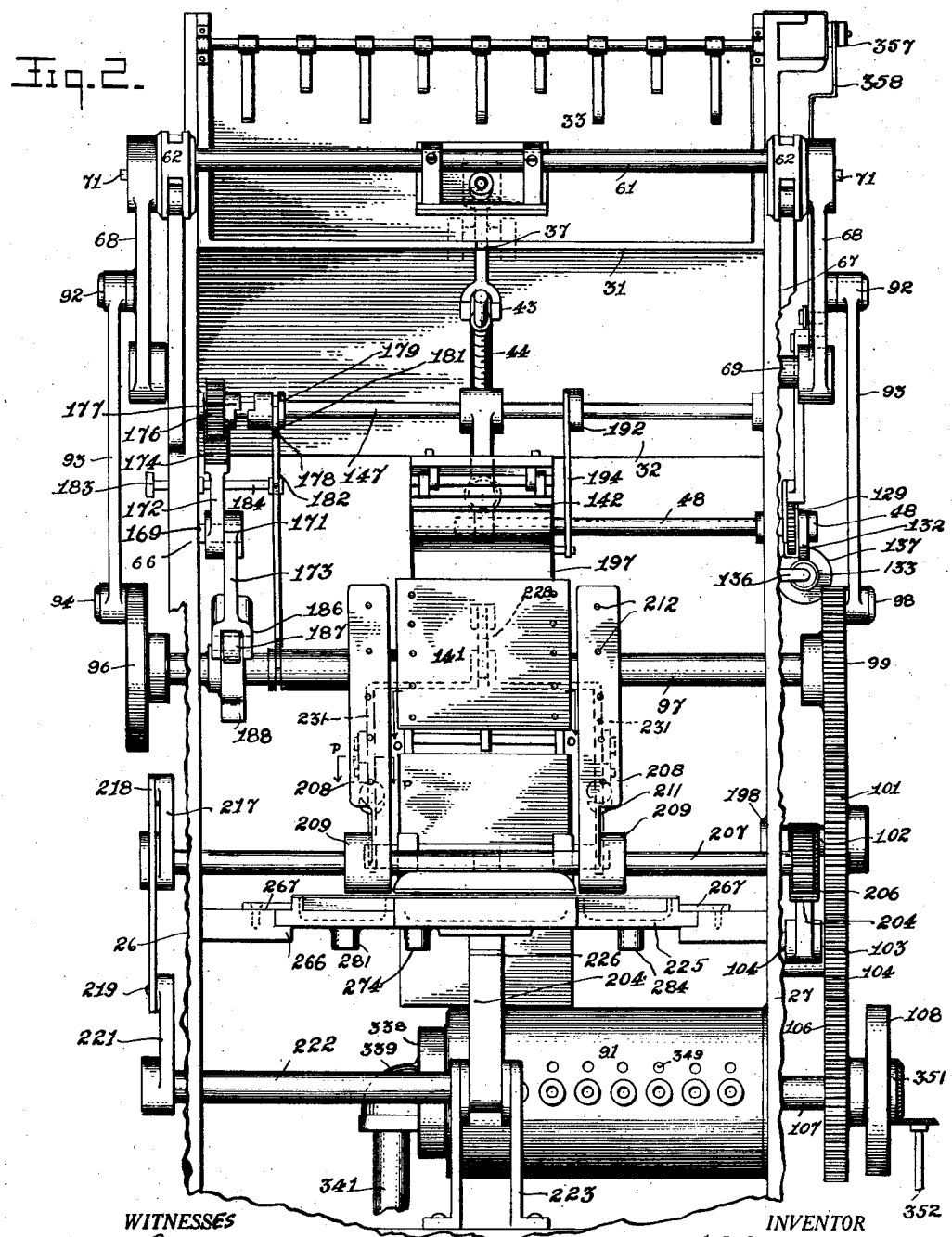
Figure 3:
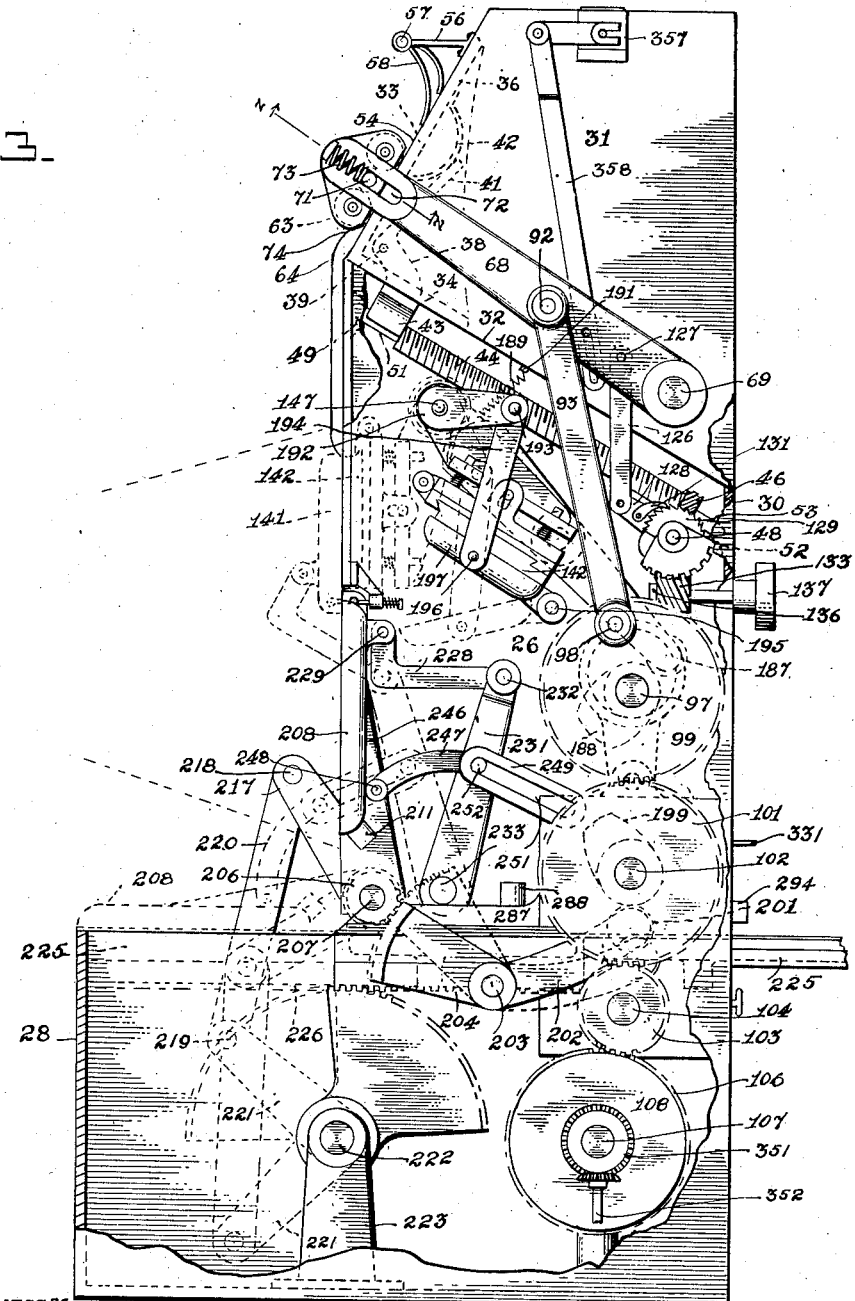
Figure 8:
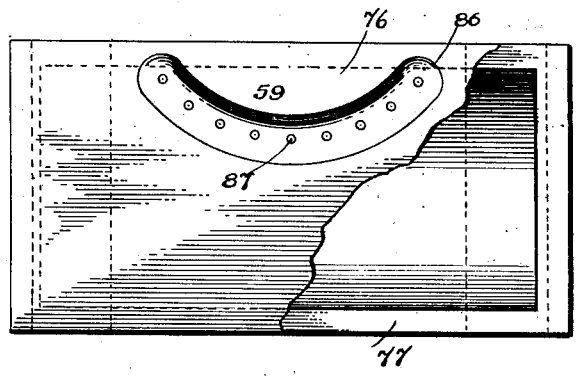
Figure 9:
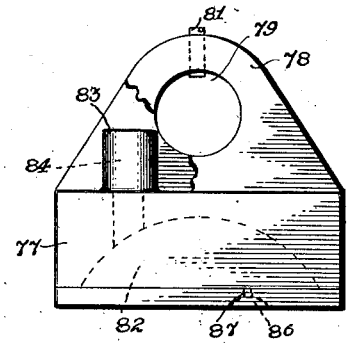
Figure 10:
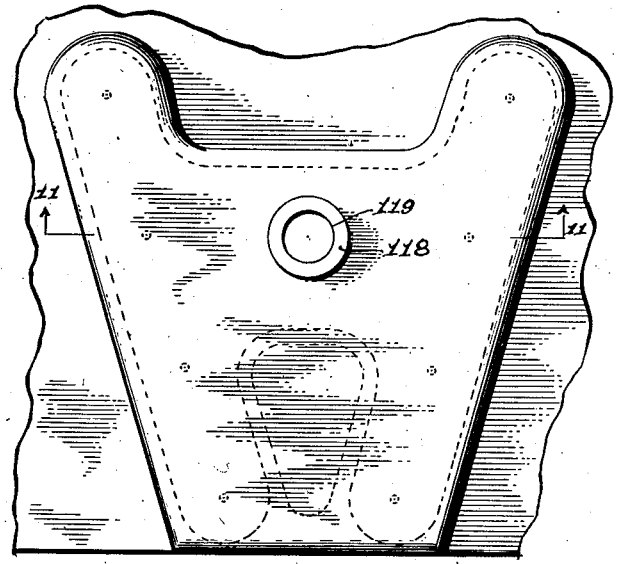
Figure 11:
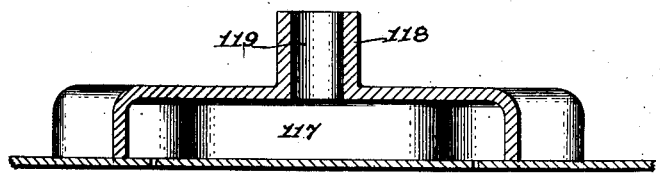

The drawings illustrate an embodiment of the invention and the views therein are as follows:

Figure 1 is a front elevational view of the check handling unit with the outer flanges broken away, Figure 2 is a similar view with the front plate removed, Figure 3 is a side elevation with the side plate of the casing removed, but with all the elements remaining in position, Figure 4 is a like view with the side plate of the casing in position, Figure 5 is a like view of the other side of the unit, Figure 6 is a diagrammatic view showing the driving mechanism and hook-up between the check handling apparatus and the camera used for photographing the checks, Figure 7 is a view partly in longitudinal section showing the suction distributor for retaining the checks in different positions in the machine, Figure 8 is a bottom plan view, partly in section, of the carrier for taking the checks from the magazine to the position for photographing the front of the same, Figure 9 is an end view, partly in section, to show the nipple which is connected by the suction hose, Figure 10 is a fragmentary rear elevational view of one side of the check holding plate for retaining the check in the position in which the front of the same is photographed, Figure 11 is a cross-sectional view on the line 11—11 of Figure 10, looking in the direction of the arrows, Figure 12 is an end view of the cancelling stamp, Figure 13 is a front view of the same, Figure 14 is a vertical sectional view thereof, taken on the line 14—14 of Figure 13, Figure 15 is a fragmentary detailed view of the mechanism for adjusting the feed member for the magazine, Figure 16 is a top plan view of the deposit plate, Figure 17 is an enlarged detailed view of the reversing plate, Figure 18 is an enlarged cross-sectional view of the distributor and is taken on the line 18—18 of Figure 7, Figure 19 is a vertical sectional view of the perforating stamp and its operating mechanism, Figure 20 is a horizontal sectional view, taken on the line 20—20 of Figure 19, Figure 21 is a fragmentary cross-sectional view of the same taken on the line X—X of Figure 20 and with the covering plate and perforating pins removed, Figure 22 is a side elevation of one of the perforating pins, Figure 23 is a sectional view taken on the line Z—Z of Figure 3 and looking in the direction of the arrows, Figure 24 is a fragmentary front elevation with the front wall plates and reversing plate removed and shows the clutch operation for the endorsing and perforating mechanisms, Figure 25 is a cross-sectional view on the line P—P of Figure 2, and Figure 26 is a like view on the line O—O of Figure 2.

The machine comprises three units, to-wit: check handling and positioning mechanism A, photographic mechanism B and operating mechanism C for operating the mechanisms A and B in proper timed relation.

The mechanism A comprises a check magazine and elevating mechanism, individual check positioning mechanism, check endorsing and stamp inking mechanism, check reversing mechanism, check depositing mechanism and check advancing, perforating and discharging mechanism.

The check handling mechanism A has sidewalls 26 and 27 extending from top to bottom of the same. The back of the mechanism is provided with a plate 30, if desired, and the front lower end of the mechanism extends forward and is provided with a front wall 28, while the main part of the unit is provided with a front wall 29. All these parts may then be bodily housed in a finishing case (not shown) and equipped with doors for giving access to the several regulating mechanism.

Check magazine and elevating mechanism

At the upper end of the check handling unit there is provided a check magazine 31 which is substantially the width of the unit and this magazine has an inwardly and downwardly sloping bottom 32 onto which checks are stacked on edge, the back face of the lowermost check resting against an elevator 33 which is right angular in section, its base 34 engaging the sloping bottom 32 of the magazine, while its leg 36 supports the checks in their vertical or, rather, inclined position in the magazine.

The base 34 and inclined bottom 32 of the magazine are provided with a slot 37 through which extends a trigger arm 38 which is pivoted in the elevator at 39 and is provided with a finger 41 which normally rests against a spring 42 for yieldably holding the same in the position shown in Figure 3.

The arm 38 of this trigger is provided with a threaded shoe 43 which is substantially semicircular in shape, and its threaded interior engages the threads on the screw 44.

This screw is mounted parallel with the sloping bottom 32 of the magazine 31 and its worm gear 46 mounted on the lower end thereof meshes with a worm wheel 47 mounted near the inner end of the shaft 48 and which said shaft is rotated to raise the shoe 43 meshing with the screw 44, as hereinafter explained.

The front wall 29 is provided with a boss 49 having an inclined recess into which the upper reduced end 51 of the screw 44 fits and in which it is free to rotate, while the rear plate 30 is provided with a boss 52 into which the lower reduced end 53 of the screw 44 fits in like manner.

It will be readily seen that upon the turning of the screw the elevator 33 will be raised and mechanism which is hereafter described, is provided for raising the elevator slightly so as to keep the uppermost check in the stack in alignment with the upper edge 54 of the magazine so that it may be readily engaged by the check positioning mechanism shortly to be described.

When the magazine 31 has been exhausted of its checks and it is desired to place a new stack of checks therein, the finger 41 may be drawn back against the leg 36 of the elevator so as to raise the shoe 43 from its engagement with the screw 44, the said trigger mechanism being pivotally mounted at 39, whereupon the elevator may be lowered to the point where the new stack of checks will present the outermost check directly in alignment with the outer edge 54 of the magazine, the shoe 43 meshing with the screw 44 at the proper point so that upon the operation of the mechanism and the turning of the shoe, the successive checks may be properly presented for pick-up by the mechanism designed for that purpose.

The upper end of each side of the magazine 31 is provided with a bracket 56 between which there extends a rod 57, which said rod is provided with resilient fingers 58 for gently engaging the outermost check in the stack to prevent its accidental displacement from said position.

The holding tension of the fingers 58 may, of course, be increased or lessened by a slight rotation of the rod 57.

Individual check pick-up and positioning mechanism

The check pick-up mechanism is mounted on a shaft 61 which has a carriage 62 at each end of the same. This carriage is substantially triangular in shape and when in its uppermost position, as shown in Figure 3, the base thereof faces the outer edge of the magazine 54.

The bases of the carriages are provided with pairs of rollers 63 which engage with and ride upon the tracks 64 formed on the flanges 66 and 67 of the side plates 26 and 27.

These carriages are in turn mounted on the outer ends of reciprocating levers 68 on each side of the unit and said levers are in turn mounted at their lower ends on the shaft 69.

The connection between the carriages 62 and reciprocating levers 68 are the pins 71 which extend out from said carriages and enter the slots 72 in said levers.

These pins 71 are urged toward the lower end of said slots by means of spiral springs 73. The upper end of the tracks 64 terminate in an incline 74 so that as the roller 63 near said incline moves downward, it is pressed outward by said incline, thereby compressing the springs 73 and moving the entire carriage 62 away from the uppermost check in the magazine 31.

As the slightest movement downward of the carriage 62 will cause its elevation away from said uppermost check, the pick-up unit 59 will, through the shaft 61 mounted in said carriages, be raised at the precise moment that the carriages start to move.

The pick-up unit 59 is shown in detail in Figures 8 and 9 and is provided with a check engaging plate 76 mounted on a casting 77, which said casting is provided with brackets 78 having holes 79 therethrough for fitting on the shaft 61 and set screws 81 for engaging said shaft to hold the said pick-up unit in proper alignment.

The bottom of the casting adjacent the plate 76 is provided with a recess 82 which, when the said plate 76 is in position, provides a suction chamber, while a nipple 83 on the same side of said casting as the brackets 78 has a hole 84 communicating with said recess so that when a suction hose is passed over said nipple it will create a vacuum in the recess chamber 82.

The plate 72 has an arcuate groove 86 in the face thereof and this arcuate groove communicates with the recess or vacuum chamber 82 through the medium of a plurality of small holes or perforations 87 extending from the arcuate groove to the other side of said plate.

The suction hose 88 connecting the nipple 83 is shown in dotted lines in Figure 1 and extends to a like nipple 89 on the vacuum distributor 91.

Pivotally connected at an intermediate point 92 on the reciprocating levers 68 are links 93 and the lower end of one of said links is eccentrically connected at 94 to a disk 96 mounted on a shaft 97, while the other link is eccentrically connected at 98 to the gear 99 mounted on the other end of said shaft.

The gear 99 meshes with the gear 101 on the stub shaft 102 and this last mentioned gear meshes with an idle gear 103 on a stub shaft 104. The idle gear 103 meshes with a gear 106 on the shaft 107 and this shaft is provided with a pulley 108 which is engaged by a belt 109 from a shaft 111.

This shaft 111 is provided with a pulley (not shown) which is driven from the motor M through the belt 112 shown in Figure 6.

The rotation of the gear 99 will reciprocate the levers 68 about their pivotal axes 69 through the medium of the link 93 so that when said levers start to move downward, the pick-up unit will have picked up the uppermost check from the stack in the magazine through the suction created in the arcuate groove 86 which, when in contact with the check, will provide a closed chamber, and as the pick-up unit is raised by the carriages passing up the incline 74 of the tracks 64, the uppermost check will be drawn from beneath the resilient fingers 58 on the rod 57 and the check will continue to move downward until the pick-up unit reverses its lowermost point of travel.

This, of course, will be at the moment when the eccentric connection 98 will be at its lowermost point of travel on the gear 99 and at this moment the suction in the vacuum chamber 82 in the casting 77 will be relieved, while suction will be created in the suction wings 113 located on each side of the lowermost point of travel of the pick-up unit 59.

The front plate 29 of the check handling mechanism is provided with a rectangular cut-out portion 114 below which is a larger rectangular cut-out portion 116.

The plate 29 is preferably cast and provided with the suction wings 113.

Figure 10 shows a fragmentary rear view of the front plate illustrating the suction wing on a larger scale.

This suction wing is constructed to provide a vacuum chamber 117 having a nipple 118 provided with a hole 119 for drawing a vacuum in said chamber through the means of a suction hose connecting said nipple.

In Figure 1 there is illustrated in dotted lines a suction hose 121 connecting the left hand suction wing and a suction hose 122 connecting the right hand suction wing. These suction hose lead to and both communicate with the nipple 123 on the distributor 91.

*Elevator operating mechanism*

It has been above stated that the elevator 33 raises the stack of checks piled therein so that the uppermost check will always be in alignment with the outer edge 54 of the magazine.

It was also above explained how the elevator is set at the proper position when a new stack of checks is placed in the magazine and so that the shoe 43 is always properly positioned on the screw 44 for presenting the uppermost check, as formerly explained.

It will, of course, be understood that it will require but a very small rise of the elevator to compensate for each check removed from the top of the stack and, therefore, that the screw 44 must be rotated a very little when each check is removed to always keep the uppermost check in alignment with the magazine edge.

As above stated, the worm gear 46 meshes with the worm wheel 47 near the inner end of the shaft 48 and this shaft 48 is actuated in the following manner:

An arm 126 is pivotally mounted at 127 to the reciprocating lever 68, while its other end is pivotally secured to a link 128 which is rotatably mounted on the shaft 48.

Fastened securely to the shaft 48 is a ratchet wheel 129 and this ratchet wheel is engaged by a pawl 131 pivotally mounted on the link 128.

There is also rotatably mounted in the shaft 48 a segmental gear 132 which meshes with the worm 133 on a shaft 134 and which said shaft is mounted in a bracket 136 and provided on its outer end with an operating button 137.

Fastened securely to the segmental gear 132 is an apron or shroud 138 which extends over the face of the ratchet wheel 129 so that its upper edge 139 will deflect the pawl 131 as the same moves downward and will cause it to be thrown outward to disengage the teeth of the said ratchet.

When the reciprocating levers 68 operate the carriages 62 and the pick-up unit 59 carries the uppermost check from the magazine 31, the arm 126 will be pushed downward, thereby rotating the link 128 and dragging the pawl 131 over the teeth of the ratchet 129.

At a certain point in the downward travel of the arm 126 and the link 128, the pawl will strike against the shroud or apron 138 at the point 139 and will be held out of engagement with the teeth.

Upon the upward stroke of the reciprocating levers 68 the arms 126 being raised, the shroud or apron 138 will prevent the pawl 131 from engaging any of the ratchet teeth until such time as the said pawl drops over the point 139 of said shroud so that only the proper number of teeth will be engaged to give the shaft 48 the proper rotation for elevating the checks to compensate for the check just removed.

The position of the apron or shroud 138 will determine the effective engagement between the pawl 131 and ratchet wheel 129 and this may be regulated to a nicety by rotating the operating button 137 for raising or lowering the said apron 138 through the medium of the worm 133 and segmental gear 132.

While, of course, checks are printed on different thicknesses of paper, a complete stack of checks will ordinarily average up so that it will be unnecessary to continuously adjust the control mechanism but, when once adjusted, it will properly present the entire number of checks in the stack and since the shoe 43 is positioned for each new stack of checks, the regulation of the elevator control mechanism will only need to be effective in steps for each stack of checks placed in the magazine.

*Check endorsing and stamp inking mechanism*

As the gear 99 continues to rotate, the check pick-up mechanism operated through the levers 68 will be returned to its uppermost position, as shown in Figures 3 and 4.

At the precise moment when this mechanism has left the check unobstructed and held in position by the suction wings 113, the photographic mechanism B will be operated so as to photograph the front face of said check.

At the moment when the shutter in the camera is closed, the check reversing plate 141 begins to raise into the position shown by dotted lines in Figure 3, and when the same arrives at the position there shown, the check endorsing plate or stamp 142 passes into the cut-out portion 114 of the front plate 29 where it aligns with the said plate 141 and thereupon stamps the bank's endorsement onto the back of the check and onto that portion extending across said cut-out portion and between the wings 113.

This endorsing and stamp inking mechanism is constructed as follows:

By reference to Figures 12, 13 and 14, it will be noted that the endorsing stamp is mounted on a supporting plate 143 and has an angularly disposed rib or wing 144 which is provided at its upper end with a hole 146 which fits over a shaft 147 (in Figure 3) and which wing is securely fixed to said shaft through a set screw 148.

The stamp 142 has an inner dove-tail 149 which fits into the dove-tail slot 151 in the outer winged plate 152 of the stamp holding means.

This outer plate is hingedly mounted at 153 to the rear plate 154 and the rear plate has lugs 156 at each side of the same which straddle the supporting plate 143 and pins 157 extending out from the sides of said supporting plate operate in slots 158 in said lugs.

The rear plate 154 is provided with a set of four or more pins 159 which pass through holes in the supporting plate 143 and these pins are shown in the drawings as being four in number and each is surrounded by a spiral spring 161 which rests between the rear plate 154 and the supporting plate 143 and provide resiliency or, in other words, give a cushioning effect for the stamp 142.

The stamp 142 is provided with the name of the bank and such other matter as is usually used on a bank endorsing stamp and has a longitudinal hole 162 extending through the same and aligned with a like hole 163 in the winged plate 152, while the rear plate 154 is provided with an enlarged recess 164 for receiving a shouldered part of a date stamp 166.

In order to provide for the changes of the date stamp which, of course, is changed daily, the winged plate 152 is provided with a spring clip 167 whose lip 168 fits around the rear plate 154 so as to hold the same securely against the plate 162.

The endorsing stamp is actuated through the following mechanism:

A stub shaft 169 is mounted in the sidewall 26 of the unit A and mounted on this shaft through a hub 171 are the extending arms 172 and 173. The former of these arms terminates in a toothed quadrant 174 which meshes with a gear 176 on the shaft 147.

The gear 176 is freely rotatable on the shaft 147 and is provided on one side of the same with a clutch face 177 which may be engaged by the clutch member 178 which is splined to the shaft 147 and which has a grooved ring 179 which is engaged by the yoke 181 on the upper end of the operating arm 182.

This clutch member 178 is operated by pulling out the button 183 on the end of the rod 184 which is connected to the arm 182 so that said clutch member is thrown into engagement with the clutch face 177 on the gear 176 and thus cause the shaft 147 to operate with said gear, as it is operated by the quadrant 174.

The lower arm 173 has a bifurcated end 186 in which is a pulley 187. This pulley is in line with and is operated by the cam 188 on the shaft 97.

The inner end of the quadrant 174 has a spiral spring 189 fastened thereto and said spring extends to and is fastened in a lug 191 extending out from the inner face of the sidewall 26.

An arm 192 is fastened securely to the shaft 147 at its one end and its outer end is pivotally connected at 193 with the upper end of a link 194 and whose lower end is pivotally connected at 196 to an inking pad 197. This inking pad is pivotally mounted on a shaft 195.

*Operation of endorsing stamp and inking pad*

As the reciprocating levers 68 carrying the pickup mechanism return to their raised position, the shaft 97 on which the gear 99 and disk 96 are located will rotate and the cam 188 thereon will strike against the roller 187 on the arm 173 which, with the arm 172, is fulcrumed on the shaft 169 and the quadrant 174 will thus be moved forward and since the clutch member 178 engages the clutch face 177 on the gear 176, said quadrant, by turning said gear, will rotate the shaft 147.

Such rotation will move the arm 192 toward a downwardly vertical position and the inking pad 197 carried on the link 194 will thus be thrown down around its pivotal point 195 to the position shown by the dotted lines in Figure 3.

At the same time that the inking pad is being lowered out of engagement with the stamp 142, the rib or wing 144 which is also securely fixed to the shaft 147 will be swung around so that the stamp will assume the position shown by the dotted lines in Figure 3, while at the same time the plate 141 will have been raised to the position therein shown by dotted lines so that the check will be embraced between the plate 141 and the stamp 142 and the cam action is sufficient to press the stamp securely against the back of the check where it may, if necessary, give a certain amount on account of its resilient mounting on the springs 161.

This position of the stamp 142 is maintained but momentarily and as the cam 182 passes from its engagement with the roller 187, the spiral spring 189 which is connected with the quadrant 174 will draw the quadrant and the fulcrumed arms 172 and 173 back to their original position, thus rotating the shaft 147 and returning the stamp 143 into the position shown in the full lines in Figure 3 and with the inking pad 197 pressed against the type of such stamp for reinking the same readily for the next operation.

It is, of course, understood that the operation of the endorsing stamp and inking pad is controlled through the clutch member 178 which is operated by the button 183 to bring the same into clutching relation with the clutch face 177 on the gear 176.

When said button is pressed inward, the clutch faces will be separated and the operation of the fulcrumed arms 173 and 172 by the cam 188 will merely turn the gear 176 by means of the quadrant 174, but since said gear is loosely mounted on said shaft, the shaft will not be rotated thereby.

*Check reversing and depositing mechanism*

The gear 101 which is mounted on a stub shaft 102 and which said stub shaft has a bearing 198 formed in the sidewall 27 of the check handling unit is adapted to operate the check reversing and depositing mechanism. This gear is meshed with the gear 103 and said latter gear meshes with a gear 106 on the driven shaft 107.

This stub shaft 102 has a cam 199 securely fixed thereto and this cam is adapted to strike at certain intervals against a roller 201 mounted in the end of an arcuate arm 202, which said arm is rockably mounted on the shaft 203 and which arm is integrally formed with a gear quadrant 204.

This quadrant 204 meshes with a gear 206 securely mounted on the shaft 207. The depositing plates 208 are secured to this shaft 207 through hubs 209.

In the position of the machine as shown in

Figures 1, 2 and 3 the depositing plates 208 and reversing plate 141 are aligned with the front of the machine and are in a vertical position.

The plates 208 have a hollow suction chamber and are each provided with a nipple 211 and with perforations 212 extending through the front wall of the same and communicating with the chamber.

The nipples 208 are connected by separate sections of flexible suction hose 213 and 214 (see Figure 1) and these sections are connected and fastened to the nipple 216 on the distributor 91.

The shaft 207 is provided on its end opposite to the end on which the gear 206 is located with an arm 217 which has a link 220 pivotally connected at 218 at its one end, while the other end of said link is pivotally connected at 219 to an arm 221 securely fastened to a shaft 222.

The shaft 222 is journaled in the side wall 26 and in bearing brackets 223 between which a quadrant 204 is securely mounted on said shaft and the teeth of said quadrant mesh with the teeth on the rack 226 on the bottom of the reciprocating table 225.

The reversing plate 141 is provided with lugs 227 on the rear of the same and these lugs have one leg of a bell lever 228 pivotally mounted between the same at 229. The other leg of said bell lever is pivotally connected to the central part of a yoke 231 at 232.

This yoke has the bottom of its legs mounted on a shaft 233, as shown in Figure 2. The reversing plate 141 is cast and is provided with a suction chamber 234 and with a nipple 236 for the connection of a suction hose 237, which said hose has its other end connected to a like nipple 238 on the distributor 91.

The depositing plates 208 and the reversing plate 141 are shown in a position with their front faces coinciding with the front plate 29 and lying within the rectangular cut-out portion 116.

Immediately upon each side of the said cut-out portion are suction wings 239 which are shaped somewhat similar to the suction wings 113 and these suction wings have a nipple 241 communicating with the suction chamber formed therein and these nipples are engaged by the hose sections 242 and 243 which are united and which unite and fit onto the nozzle 244 on the distributor 91.

The supporting rib 246 on one or both of the depositing plates 208 has an arcuate arm 247 pivotally connected at 248.

This arm 247 terminates at its inner end in a link 249 which has a slot 251 extending substantially throughout the length of the same.

A pin 252 in the leg of the bracket 231 extends through the slot 251 of the link 249.

The reversing plate 141 has an upstanding rib 253 to which a rod 254 is pivotally connected. (See Figure 17). This rod is mounted in a sleeve 256 carried by a bracket 257.

The outer end of the rod 254 has a washer and a nut 258 fastened securely thereon, while between said washer and nut and the outer end of the sleeve 256 a spiral spring 259 encircles said rod.

*Operation of check reversing and depositing mechanism*

The quadrant 204 has a spiral spring 260 fastened to the lower side of the same and the other end of said spring is fastened to a lug 262 which is formed integral with the side wall 27.

In order to describe the action of the check reversing plate whereby it is raised to the position shown in dotted lines in Figure 3, it will be necessary to first describe the operation of the depositing plates, although up to this stage in the specification there is no check located at a position for engagement by the depositing plates.

However, when the cam 199 on the shaft 102 strikes against the roller 201 on the arcuate arm 202, said arm will be lowered into the dotted line position, and on account of its being rockably mounted on the shaft 203, the quadrant 204 will start upward to assume the position shown by the dotted lines.

In taking this position the quadrant will rotate the gear 206, fixedly secured to the shaft 207, and the depositing plates being secured to said shaft will swing downward from their full line position to the dotted line position shown in Figure 3.

As the plates 208 swing downward they will draw the arcuate arm 247 and the slotted link 249 forward until the end of the slotted link strikes the pin 252 on the yoke 231 whereupon said yoke will be drawn forward, and since the reversing plate 141 is hingedly mounted at 261, the action of the bell lever 228 is to swing the reversing plate 141 into the position shown by the dotted lines in Figure 3, and as the bell lever 228 and yoke 231 move forward, the pressure exerted thereby on the said reversing plate 141 will cause the said plate to pull the rod 254 forward by compressing the spring 259 until the said rod and nut 258 assume the dotted line position such as shown in Figure 17.

It was before explained how the check had been withdrawn from the stack in the magazine and brought to a position behind the dotted line position of the reversing plate 141 and the manner in which the same was held in that position by the suction wings 113.

As the reversing plate 141 arrives at the position shown by dotted lines in Figure 3, sufficient time elapses for the endorsing stamp 142 to operate in the event that the clutch member 178 is meshed with the clutch face on the gear 176 and during this operation the suction is released from the suction wings 113, while suction is simultaneously maintained in the suction chamber of the reversing plate 141.

The time lapse just above referred to occurs when the roller 201 on the arcuate arm 202 is passing over the dwell 263 on the outer end of the cam 199 and this dwell must be of sufficient length to permit the operation of the endorsing stamp 142, as before explained.

Immediately the cam 199 disengages itself from the roller 201, the spiral spring 260 pulls the quadrant 204 back into its full line position and this action will cause a reverse movement of the parts, the depositing plates 208 being first moved part-way up into their full line position before the reversing plate 141 leaves its dotted line position, as shown in Figure 3.

When, however, the end of the slots next the arm 247 of the slotted link 249 strikes the pin 253 on the yoke 231, the bell arm 228 will be pulled into its full line position, drawing the reversing plate 141 back and into its initial position, as indicated in Figures 1 and 2.

The suction on the reversing plate 141 is discontinued when the plate assumes this position and simultaneously therewith suction is maintained in the suction wings 239, thereby holding the check in the same position as formerly and ready to be photographed.

It will, of course, be understood that during the time that this reversing operation has been taking place the check pick-up and positioning mechanism will have again operated so as to have placed another check in position to be held by the suction wings 113 so that as the camera is again automatically snapped, the photograph of the back of the first check and front of the newly positioned check will be taken on a single frame. This operation continues indefinitely and as long as there are any checks remaining in the magazine 31, that is, the front of one check and the rear of the preceding check are photographed simultaneously.

When the camera shutter has been operated, the suction in the wings 239 is suspended and suction simultaneously is exerted by the depositing plates 208 so that when the cam 199 again strikes the roller 201 in the end of the arcuate arm 202, the depositing plates will swing downward into the position shown by dotted lines in Figure 3 and as previously explained.

*Check advancing, perforating and discharging mechanism*

The reciprocating table 225 is provided with sliding side flanges 264 which rest upon inwardly extending tracks 266 and are maintained in position by plates 267.

This table is preferably cast and finished and is provided with a front recess 268 and rear recesses 269 and 271.

The recess 268 is covered by a plate 272 which is held in position by means of screws 273 so as to form of said recess a suction chamber which is provided with a nipple 274 providing an attachment for the suction hose 276 which is fastened onto a like nipple 277 of the distributor 91.

The plate 272 is provided with perforations 278 for retaining the checks deposited by the depositing plates 208.

The recesses 269 and 271 are each covered with a plate 279 and the recess 269 which, together with said plate 279, forms a suction chamber is provided with a nipple 281 to which is attached a suction hose 282 and whose other end is connected with a suction hose 283 extending from a like nipple 284 on the suction chamber formed by the recess 271 and the plate 279.

These combined suction hose are then connected to a nipple 286 on the distributor 91.

When the reciprocating table 225 is in its forward position, there is located just to the rear of the plate 272 and between the plates 279 a suction plate 287 which is provided with a nipple 288 to which is attached a suction hose 289 which extends down to and is connected over a nipple 291 on the distributor 91.

*Operation of the reciprocating table*

Considering now that the depositing plates 208 are in the dotted line position shown in Figure 3. As the cam 99 is disengaged from the roller 201 on the arcuate arm 202, the spiral spring 260 will draw the quadrant 204 downward, thereby rotating the gear 206 and shaft 207 and raising the arm 217 which is secured thereto.

This raising of the arm 217 will rotate the shaft 222 through the medium of the link 220 and arm 221 which is fixed to said last named shaft.

As the quadrant 224 is secured to said last named shaft, it will be rotated from its dotted line position in Figure 3 to the full line position, thereby sliding the reciprocating table 225 back to the full line position shown in said figure.

At the moment when the depositing plates 208 assume their dotted line position, suction therein was immediately discontinued and suction was created through the perforations 278 in the plate 272 so that when the said table moved to its full line position, the check on the plate 272 was carried to a point immediately beneath the suction plate 287.

At the time when the parts are in this position suction is released from the plate 272 and established on the plate 287 so that the check is maintained on the last mentioned plate, while the reciprocating table is again moved to its dotted line position in Figure 3.

At the precise moment when the table again assumes its forward dotted line position, suction is released on the plate 287 and is maintained on the plates 279 so that as the table is again moved rearwardly, the check is again moved toward the rear of the machine and under the perforating mechanism where it may or may not be perforated, depending upon whether or not the check is a transit check or a bookkeeping check.

If it is a transit check it is maintained under the perforating device by suction from the suction chamber 292 exerted on the suction plate 293 and said chamber is provided with a nipple 294 which is connected by a suction hose 296 which extends to and fits over the nipple 297 on the distributor 91.

If it is a bookkeeping check it is maintained both by the action of said suction plate 293 and the perforated mechanism as hereinafter described.

Of course, at the precise moment that the suction is exerted on the suction plate 293, it is released on the plates 279 so that when the table again moves forward to its dotted line position the check is retained under the perforating mechanism and as said table again moves to its full line position, suction is released on the plate 293 and again retained on the plates 279 so that the check is pushed forward from the unit and maintained on that portion 298 of the same which extends from the rear thereof.

As the table again moves forward the check is retained by suitable mechanism (not shown) for guiding it into a proper receptacle for stacking the same.

*Check perforating mechanism*

The check perforating mechanism, details of which are shown in Figures 19 to 21 inclusive, is mounted in the opening between the suction plates 279 of the reciprocating table 225.

The casing 299 for the die mechanism is shown in Figure 19 as integrally formed with a back wall designated at 301.

A die box 302 is slidably mounted in the casing 299 and is operated by means of a connecting arm 303 pivotally mounted on a pin 304 fastened between the elevated lugs 306 on the sides of said box.

The upper end of said connecting arm 303 terminates in a circular bearing 307 which fits around an eccentric disk 308 rotatably mounted on a shaft 97. This disk has a clutch face 309 (see Figure 24) adapted to be engaged by the clutch member 311 on the inner end of the slidably mounted sleeve 312.

This sleeve is splined to the shaft 97 and has a grooved ring 313 engaged by a yoke 314 on the lower end of the operating arm 182.

As before explained, the endorsing mechanism and perforating mechanism are never used simultaneously. In the case of transit checks the endorsing stamp is placed thereon, but the checks are not canceled by perforation since they must pass onto the bank upon which they are drawn and are canceled in that bank.

The bookkeeping checks, however, that is, checks which are drawn on the bank in which it is presumed the machine is located are not endorsed, but are canceled by perforating and the checks are then deposited against the account of the depositor and returned to him with his statement.

It will, therefore, be readily seen that by pulling the button 183 outward the arm 182 will be operated so as to engage the clutch member 178 with the clutch face 177 on the gear 176 so as to operate the endorsing mechanism, while such action will draw the sleeve 312 outward so as to disengage the clutch member 311 from the clutch face 309, thereby permitting the shaft 97 to continue to rotate without turning the eccentric disk 308 and, consequently, without operating the die box 302 through the connecting arm 303.

It therefore follows that when bookkeeping checks are being run through the unit, the button 183 will be pushed inwardly so as to disengage the clutch units 178 and 177 and to engage the clutch members 309 and 311, thus throwing the endorsing mechanism into inoperation condition while placing the perforating mechanism in operating condition.

The die box 302 is provided with a pair of guide plates 313 and 314 and these plates are provided with holes 316 and covering their entire surface as included within said box and said holes are arranged lengthwise and across in perfect lines and in spaced relation.

Fitting through each of the holes in the plates 313 and 314 are perforating pins 317, each of which is provided with a collar 318 for normally resting on the upper face of the plate 314.

The lower end of the pins 317 extend into holes 319 extending through the guide plate 321 in the bottom of the casing 299 and these holes are aligned with the holes 316 in the plates 313 and 314.

These holes 316 and 319 are of such diameter that the perforating pins 317 may freely move through the same and will, when unobstructed, always have their collars 318 resting on the upper face of the guide plate 314.

Below the bottom of the casing 299 is a support 322 which has an opening 323 of exactly the same size as the opening in the die box 302.

While across this opening and flush with the top of said support is the female die plate 324 whose holes 326 correspond with the holes in the plates 313, 314 and 321, but this plate 324 is made of tool steel and the pins 317 are adapted to cut through any material placed between said plate and the plate 321 on the bottom of the casing 299.

The support 322 is provided below the opening 323 with a rectangular opening 327 which provides a space for a drawer 328 which catches the material cut from the paper between the die plate 324 and the guide 321 by the perforating pins 317 and this drawer is provided with a knob 329 for removing the same to remove the scraps of material therefrom.

The perforating pins 317 are controlled by the pattern plates 331. These pattern plates are required to be changed daily as the date and such other matter as the bank desires to perforate into the check is controlled solely thereby.

These plates are provided with a plurality of holes 332 which are of sufficient size to admit the free passage of the upper ends of the perforating pins 317 therethrough, but these plates are not filled with holes as are the plates 313, 314, 321 and the die plate 324, but certain of the holes are omitted, depending upon the pins which it is desired should pass down through the material to be perforated and into the holes 326 in the die plate 324 so that when the check or other material is extended through the slot 333 between the die plate 324 and the guide plate 321 and the die box 302 is lowered by the action of the disk 308 on the shaft 97, the pins 317 will all drop onto the upper surface of said check or material and those pins which have one of the holes 332 directly above the same will pass through said holes, but the pins which have no hole beyond the same in the pattern plate 331 will be forced down through the check or other material and into the holes 326 of the female die plate 324, thereby perforating the check or other material with the pattern controlled by the pattern plate 331.

It therefore follows that with this type of perforator, any desired date or other matter may be perforated through a check or other material by merely changing the pattern plate 331, which plate is extended through the slot 334 and is free to be moved vertically by the cam 308 by reason of the opening 336 in the back of the casing 299.

The distributor

For the description of the distributor, reference may be had to Figures 2, 7 and 18.

The distributor casing 337 has its one end mounted on the sidewall 27 and its other end supported by the end ring 338 formed integral with the elbow 339 secured on the top of the vacuum pipe 341 which extends to the equalizer 342. (See Figure 6.) The separate distributing units 343 are mounted on a shaft 107 which carries the gear 106 and pulley 108.

Since each of the distributing units has a spider support 346 a common vacuum is drawn from the interior of each of the units through the pipe 341. Each of the units is provided with a port 347 which is arranged in proper timed relation for exerting a suction on the desired suction plate and such port is of a width whereby its particular suction nozzle may communicate with the interior of said unit or units so long as it is desired to sustain the vacuum on the particular suction plate.

For the release of this vacuum there is provided in each of the units 343 a by-pass 348 which communicates with the particular nozzle of said unit and with a relief or bleed valve 349 which permits the suction plate to obtain air at atmospheric pressure.

The equalizer 342 will maintain as nearly a perfect vacuum as possible so that quick action through the distributor may be obtained and the relief valves 349 will be so constructed that the vacuum created in the individual suction plates will be immediately released when it is desired to drop one of the checks.

The equalizer has a pipe 354 leading therefrom to a vacuum pump 356 which is located on the driven shaft 111.

The camera

The camera or photographic unit B is provided with two rolls of films (not shown) which may be operated in unison or only one of said films may be operated if desired.

In the case of transit checks the duplicate film is usually used because one firm is sent as a transit letter with the checks for payment and the other film is retained by the bank for its record.

In the case of bookkeeping checks, only one film is ordinarily used and this film is retained by the bank for its record.

The film or films are operated from the bevel gear 351 on the shaft 107 which meshes with a like gear on the shaft 352 and this shaft is provided at its lower end with a bevel gear which meshes with a like gear on the shaft 353, while gear mechanism on the other end of said last shaft operates mechanism in the photographic unit which gives the film or films intermittent movement and operates the shutter or shutters of said photographic unit so as to open the same at the precise moment when a check has been placed upon and held by the suction wings 113 and when the depositing plates 208 have been elevated to their vertical positions and the reversing plate 141 has just reversed a check formerly held by the wings 113 and now held by the wings 239.

As the reversing plate 141 comes to its lowered position, such as shown in Figure 1, the pick-up mechanism 59 will have returned to its upper position, as shown in Figures 1, 2 and 3, and there will be no obstructions before the face of the upper check and the rear of the lower check, the same being held in position, respectively, by the suction created from the wings 113 and the wings 239.

When desired the check handling unit may be provided with a counter 357 of any approved type which may be operated through the medium of a lever 358 connected to one of the reciprocating levers 68 so that the said counter 357 is actuated upon each cycle of said reciprocating lever.

It will be readily seen that with my improved check handling, photographing, endorsing and cancelling mechanisms, a stack of checks may be placed in the magazine, the uppermost check being intermittently removed, placed in position for photographing the face of the same, endorsing the same automatically when desired, reversing the check, photographing the back of the same, then passing the check in a position to be canceled, when desired, and then emitting the check from the mechanism for stacking in the same sequence in which the same was originally stacked in the magazine.

The check handling, photographing, endorsing and perforating mechanisms illustrated by the drawings are susceptible of many alterations and changes without departing from the invention herein set forth and hereafter claimed.

The invention is hereby claimed as follows:

1. Check positioning and photographing mechanism comprising means for holding a stack of checks, mechanism for intermittently positioning one of said checks for photographing, means actuated by the positioning mechanism for moving the stack of checks so as to present the outermost one for engagement by said positioning mechanism, and means operating in proper timed relation with said mechanism for photographing said intermittently positioned checks.

2. Check positioning and photographing mechanism comprising means for holding a stack of checks, mechanism for intermittently positioning one of said checks for photographing, means actuated by the positioning mechanism for moving the stack of checks so as to present the outermost one for engagement by said positioning mechanism, separate means for holding said positioned check for photographing, and means operating in proper timed relation with said mechanism for photographing said intermittently positioned checks.

3. Check positioning and photographing mechanism comprising means for intermittently positioning one of said checks for photographing, an interchangeable stamp operated by said mechanism for endorsing said positioned check, and means operating in proper timed relation with said mechanism for photographing said intermittently positioned checks.

4. Check positioning and photographing mechanism comprising means for intermittently positioning one of said checks for photographing, an interchangeable stamp operated by said mechanism having means for inking the same for endorsing the positioned check, and means operating in proper timed relation with said mechanism for photographing said intermittently positioned checks.

5. Check positioning and photographing mechanism comprising means for holding a stack of checks, mechanism for intermittently positioning one of said checks for photographing, means actuated by the positioning mechanism for moving the stack of checks so as to present the outermost one for engagement by said positioning mechanism, mechanism for reversing said checks so as to exhibit the rear thereof, and means operating in proper timed relation with said mechanisms for photographing said intermittently positioned checks.

6. Check positioning and photographing mechanism comprising means for holding a plurality of checks, mechanism for intermittently positioning one of said checks for photographing, means actuated by the positioning mechanism for endorsing said check, mechanism for reversing said check so as to exhibit the rear thereof, and means operating in proper timed relation with said mechanism for photographing the face of one check and the rear of the preceding check.

7. Check photographing, endorsing and perforating mechanism comprising means for holding a plurality of checks, means for positioning said checks to exhibit the front of one check and the rear of the preceding check, means actuated by the positioning mechanism for endorsing said checks, means actuated by the positioning mechanism for perforating said checks, and means for rendering inactive, either the means for endorsing, or the means for perforating said checks.

8. Check positioning and photographing mechanism comprising means for holding a plurality of checks, mechanism for intermittently positioning one of said checks for photographing, mechanism operated by the positioning mechanism for reversing said checks so as to exhibit the rear thereof, means operating in proper timed relation with said mechanisms for photographing said intermittently positioned checks, and mechanism operated by the positioning mechanism for perforating said checks.

9. A check handling unit comprising a magazine for holding a stack of checks, means for automatically removing the outermost check for photographing, and means operated by said first means for advancing the stack of checks so as to properly position the outermost check for engagement by said first named means.

10. A check handling unit comprising a magazine for holding a stack of checks, means for automatically removing the outermost check for photographing, means operated by said first means for advancing the stack of checks so as to properly position the outermost check for engagement by said first named means, and means operating in proper timed relation with said first means for endorsing said check.

11. A check handling unit comprising a magazine for holding a stack of checks, means for automatically removing the outermost check for photographing, means operated by said first means for advancing the stack of checks so as to properly position the outermost check for engagement by said first named means, and means operated by said first means and operating in proper timed relation with said first means for perforating said check.

12. A check handling unit comprising a magazine for holding a stack of checks, means for automatically removing the outermost check for photographing, means operated by said first means for advancing the stack of checks so as to properly position the outermost check for engagement by said first named means, means operated by said first means for endorsing the removed checks, means operated by said first means for perforating said checks, and means for rendering one or the other of said endorsing means or perforating means inactive while the other is active.

13. In a machine for photographically recording documents, means for placing the document in the first position to be photographed, means for stamping information onto the rear of said document while in said first position, and means for reversing the document to photograph the reverse side thereof, including the information stamped thereon.

14. In a machine for photographically recording documents, the combination of means for feeding the documents to the photographic field, means for reversing the document for photographing the reverse side thereof, and means for marking each document while in the photographic field and before reversing same.

15. In a machine for photographically recording documents, the combination of means for feeding the documents to the photographic field, means for marking the documents while in said field, and means for placing the documents in position for photographing the markings placed thereon.

16. In a machine for photographically recording documents, the combination of means for feeding the documents to the photographic field, means including a stamp equipped for changing the information thereon for marking the documents while in said field, and means for placing the documents in position for photographing the markings placed thereon.

17. In combination with a machine for photographically recording documents, of means for carrying the documents through the photographic field, means for halting the documents after they have passed said field, and means for perforating data into said documents while halting.

18. Check photographing, endorsing and perforating mechanism comprising means for positioning checks to exhibit the front of one check and the rear of another check, means for endorsing markings onto the rear of each check while exhibiting the front thereof, means operated after the checks have left the photographic field for perforating the same, and means for rendering either the endorsing or perforating means inactive.

19. In a machine for photographically recording documents, positive feed means for introducing the document into the machine, mechanism for positioning the document for photographing, means for reversing the document for photographing the reverse side, and means actuated by the positioning mechanism for endorsing said document.

RAYMOND M. HESSERT.